US012567632B2

(12) United States Patent
Lee et al.

(10) Patent No.: US 12,567,632 B2
(45) Date of Patent: Mar. 3, 2026

(54) BATTERY PACK, AND ELECTRONIC DEVICE AND VEHICLE INCLUDING THE SAME

(71) Applicant: LG ENERGY SOLUTION, LTD., Seoul (KR)

(72) Inventors: Tae-Kyeong Lee, Daejeon (KR); Young-Il Yoon, Daejeon (KR); Sung-Hoon Woo, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 604 days.

(21) Appl. No.: 17/774,264

(22) PCT Filed: Apr. 27, 2021

(86) PCT No.: PCT/KR2021/005340
§ 371 (c)(1),
(2) Date: May 4, 2022

(87) PCT Pub. No.: WO2021/221446
PCT Pub. Date: Nov. 4, 2021

(65) Prior Publication Data
US 2022/0393277 A1      Dec. 8, 2022

(30) Foreign Application Priority Data

Apr. 29, 2020    (KR) ........................ 10-2020-0052830

(51) Int. Cl.
*H01M 50/209*    (2021.01)
*H01M 10/613*    (2014.01)
(Continued)

(52) U.S. Cl.
CPC ....... *H01M 50/209* (2021.01); *H01M 10/613* (2015.04); *H01M 10/6556* (2015.04); *H01M 50/271* (2021.01); *H01M 50/30* (2021.01)

(58) Field of Classification Search
CPC ........... H01M 10/613; H01M 10/6556; H01M 50/204; H01M 50/30; H01M 50/271
(Continued)

(56) References Cited

U.S. PATENT DOCUMENTS 10,381,622 B2    8/2019   Kim et al.
10,446,813 B2    10/2019  Kim et al.
(Continued)

FOREIGN PATENT DOCUMENTS

CN        107709089 A      2/2018
CN        109028315 A      12/2018
(Continued)

OTHER PUBLICATIONS

International Search Report (PCT/ISA/210) issued in PCT/KR2021/005340, dated Aug. 19, 2021.
(Continued)

*Primary Examiner* — Allison Bourke
*Assistant Examiner* — Robert Gene West
(74) *Attorney, Agent, or Firm* — Birch, Stewart, Kolasch & Birch, LLP

(57) ABSTRACT

A battery pack includes a plurality of battery modules respectively having a discharge port configured to discharge a gas generated therein to the outside; a tray to which the plurality of battery modules are mounted, the tray having a discharge hole for discharging a gas to the outside; and a pair of side covers having body portions elongated in one direction and respectively located at one side and the other side of the tray, a plurality of inlets formed by opening a part thereof and respectively connected to the discharge port, and at least a gas discharge portion configured to transport a gas introduced from the inlet to the discharge hole.

18 Claims, 5 Drawing Sheets

(51) Int. Cl.

| | |
|---|---|
| *H01M 10/6556* | (2014.01) |
| *H01M 50/271* | (2021.01) |
| *H01M 50/30* | (2021.01) |

(58) Field of Classification Search

USPC .......................................................... 429/99

See application file for complete search history.

(56) References Cited

U.S. PATENT DOCUMENTS

| | | | |
|---|---|---|---|
| 10,622,610 B2 | 4/2020 | Seo et al. | |
| 10,790,550 B2 | 9/2020 | Kwon et al. | |
| 11,217,857 B2 | 1/2022 | Lindstrom et al. | |
| 2006/0092631 A1* | 5/2006 | Storey ................... | H01M 50/30 |
| | | | 362/267 |
| 2012/0045672 A1* | 2/2012 | Kruger ................ | H01M 50/209 |
| | | | 429/82 |
| 2012/0231316 A1 | 9/2012 | Sohn | |
| 2012/0288738 A1 | 11/2012 | Yasui et al. | |
| 2013/0143083 A1* | 6/2013 | Utley ................... | H01M 50/367 |
| | | | 429/88 |
| 2013/0342168 A1* | 12/2013 | Okumura .............. | H02J 7/0068 |
| | | | 320/167 |
| 2015/0188207 A1* | 7/2015 | Son ...................... | H01M 50/271 |
| | | | 429/224 |
| 2017/0365888 A1 | 12/2017 | Kwon et al. | |
| 2018/0105062 A1 | 4/2018 | Fees et al. | |
| 2018/0154754 A1 | 6/2018 | Rowley et al. | |
| 2018/0337375 A1 | 11/2018 | Kellner et al. | |
| 2019/0348652 A1 | 11/2019 | Zhao et al. | |
| 2020/0006825 A1 | 1/2020 | Lee et al. | |
| 2020/0185672 A1* | 6/2020 | Seo ................... | H01M 10/6568 |
| 2021/0175572 A1 | 6/2021 | He et al. | |
| 2022/0393277 A1 | 12/2022 | Lee et al. | |
| 2023/0092616 A1 | 3/2023 | Lee et al. | |

FOREIGN PATENT DOCUMENTS

| | | | | |
|---|---|---|---|---|
| CN | 208539064 U | 2/2019 | | |
| CN | 110379963 A | 10/2019 | | |
| CN | 210092152 U | 2/2020 | | |
| CN | 214672872 U | 11/2021 | | |
| DE | 10 2017 114 749 A1 | 10/2018 | | |
| DE | 10 2017 110 578 A1 | 11/2018 | | |
| EP | 2506336 A1 * | 10/2012 | .............. | B60K 1/04 |
| EP | 3 346 517 A1 | 7/2018 | | |
| EP | 3 584 877 A1 | 12/2019 | | |
| JP | 2005-322434 A | 11/2005 | | |
| JP | 2011-70871 A | 4/2011 | | |
| JP | 2011-171052 A | 9/2011 | | |
| JP | 2012-79519 A | 4/2012 | | |
| JP | 2012079510 A * | 4/2012 | | |
| JP | 2013-120642 A | 6/2013 | | |
| JP | 2014-107178 A | 6/2014 | | |
| JP | 2015-185225 A | 10/2015 | | |
| JP | 2018-18755 A | 2/2018 | | |
| JP | 2019-46578 A | 3/2019 | | |
| JP | 2023-501733 A | 1/2023 | | |
| KR | 10-2017-0063128 A | 6/2017 | | |
| KR | 10-2017-0142442 A | 12/2017 | | |
| KR | 10-2018-0006150 A | 1/2018 | | |
| KR | 10-2019-0022485 A | 3/2019 | | |
| KR | 10-2019-0040259 A | 4/2019 | | |
| KR | 10-2030726 B1 | 10/2019 | | |
| KR | 10-2033101 B1 | 10/2019 | | |
| KR | 10-2043864 B1 | 11/2019 | | |
| KR | 10-2065099 B1 | 1/2020 | | |
| WO | WO 2012/081137 A1 | 6/2012 | | |

OTHER PUBLICATIONS

Extended European Search Report for European Application No. 21797920.2, dated Jul. 18, 2024.
Extended European Search Report for European Application No. 25170778.2, dated Aug. 13, 2025.

* cited by examiner

FIG. 7

BATTERY PACK, AND ELECTRONIC DEVICE AND VEHICLE INCLUDING THE SAME

TECHNICAL FIELD

The present application claims priority to Korean Patent Application No. 10-2020-0052830 filed on Apr. 29, 2020 in the Republic of Korea, the disclosures of which are incorporated herein by reference.

The present disclosure relates to a battery pack, and an electronic device and a vehicle including the battery pack, and more particularly, to a battery pack with improved safety by preventing a secondary explosion or thermal runaway phenomenon.

BACKGROUND ART

Recently, as the demand for portable electronic products such as laptops, video cameras and portable telephones is rapidly increasing along with full-scale developments of electric vehicles, energy storage batteries, robots, satellites, and the like, a high-performance secondary battery capable of repetitive charging and discharging is being actively studied.

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

The lithium secondary battery mainly uses lithium-based oxides and carbonaceous materials as a positive electrode active material and a negative electrode active material, respectively. In addition, the lithium secondary battery includes an electrode assembly in which a positive electrode plate coated with the positive electrode active material and a negative electrode plate coated with the negative electrode active material are disposed with a separator being interposed therebetween, and an exterior, namely a battery case, for hermetically containing the electrode assembly together with an electrolyte.

In addition, the lithium secondary battery may be classified depending on the shape of the exterior into a can-type secondary battery in which an electrode assembly is embedded in a metal can and a pouch-type secondary battery in which the electrode assembly is embedded in a pouch made of an aluminum laminate sheet.

In particular, the demand for large-capacity battery packs applied to electric vehicles is increasing recently. Such a large-capacity battery pack includes a plurality of battery modules. Thus, if a fire or thermal runaway occurs in some of the plurality of battery modules, the fire or thermal runaway propagates to other adjacent battery modules. Accordingly, the safety of the battery pack has become a major problem.

Moreover, the battery pack mounted to a vehicle needs to be prepared for a large impact caused by a vehicle collision. Accordingly, there is a need to solve problems such as damage to internal components in the battery pack caused by an external impact, or a fire or explosion of the secondary batteries. In particular, if a cooling member is damaged, the coolant inside the cooling member leaks out, thereby causing an electrical short between the battery modules.

DISCLOSURE

Technical Problem

The present disclosure is designed to solve the problems of the related art, and therefore the present disclosure is directed to providing a battery pack with improved safety by preventing a secondary explosion or thermal runaway phenomenon.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack, comprising: a plurality of battery modules, each battery module of the plurality of battery modules having a discharge port configured to discharge a gas generated therein to the outside;

a tray to which the plurality of battery modules are mounted, the tray having a discharge hole for discharging the gas to the outside; and a pair of side covers, each side cover of the pair of side covers having a body portion elongated in one direction and respectively located at a first side and a second side of the tray, a plurality of inlets formed by opening a part thereof and respectively connected to a respective discharge port of the plurality of battery modules, and a gas discharge portion configured to transport the gas introduced from the inlet to the discharge hole.

Also, the gas discharge portion may have a gradually increasing sectional area in a direction of the discharge hole of the tray.

Moreover, the body portion of each side cover may have an inner space surrounded by an outer wall, and a reinforcing rib extending from an inner surface of ene-a first side of the body portion to an inner surface of a second side of the body portion may be provided in the inner space.

In addition, the battery module may include:

a plurality of secondary batteries; and a module housing configured to accommodate the plurality of secondary batteries therein, wherein a fixing portion configured to be coupled to the side cover may be provided to at least one of a first side and a second side of the module housing.

Also, the plurality of secondary batteries may be configured to discharge the gas in a first side direction or in a second side direction when an abnormal behavior occurs.

Moreover, the battery pack may further comprise a cooling pipe configured to allow a coolant to flow therein, wherein a first side cover of the pair of side covers may include a pipe accommodation portion configured to surround at least a part of the cooling pipe so that the cooling pipe is accommodated therein.

In addition, the tray may include a temporary storage portion configured so that when a coolant leaks out from the cooling pipe, the leaked coolant flows into the temporary storage portion.

Also, each side cover may further include a mounting portion having a fastening structure to be coupled to an external device and provided to an outer side of the body portion.

Moreover, each battery module may include a stopper configured to seal the discharge port below a predetermined temperature and melt above the predetermined temperature to open the discharge port.

In addition, in another aspect of the present disclosure, there is also provided an electronic device, comprising at least one battery pack.

Also, in another aspect of the present disclosure, there is also provided a vehicle, comprising at least one battery pack.

The tray may have a base plate and a mount plate above the base plate, a space between the base plate and mount plate and the mount plate creating an opening to the space.

The gas discharge portion may be above the pipe accommodation portion.

Advantageous Effects

According to an embodiment of the present disclosure, since the present disclosure includes a pair of side covers having body portions elongated in one direction and respectively located at one side and the other side of the tray, a plurality of inlets formed by opening a part thereof and respectively connected to the discharge port, and a gas discharge portion configured to transport the gas introduced from the inlet to the discharge hole, when a high-temperature gas is generated due to an abnormal behavior such as fire or thermal runaway at any one of the plurality of battery modules, the generated high-temperature gas may be discharged to the outside through the gas discharge portion of the side cover located in an outer direction without raising the temperature of adjacent battery modules, thereby increasing the safety of the battery pack.

Moreover, according to an embodiment of the present disclosure, since the side cover includes a pipe accommodation portion whose outer wall is formed to surround at least a part of the cooling pipe so that the cooling pipe is accommodated therein, the side cover may surround and protect the cooling pipe, thereby preventing the cooling pipe from being damaged due to an external impact.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

FIG. 7 is a partial bottom view schematically showing a battery module, employed at a battery pack another embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
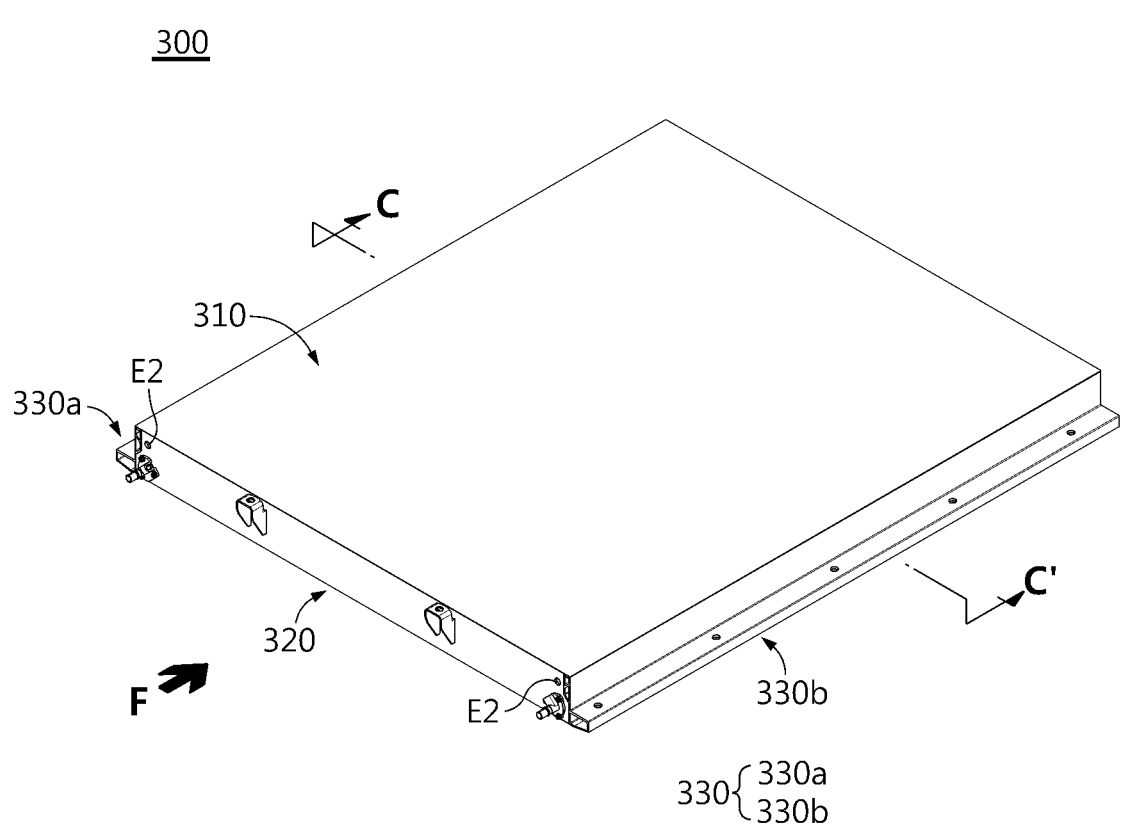
FIG. 1 is a perspective view schematically showing a battery pack according to an embodiment of the present disclosure.
Figure 2:
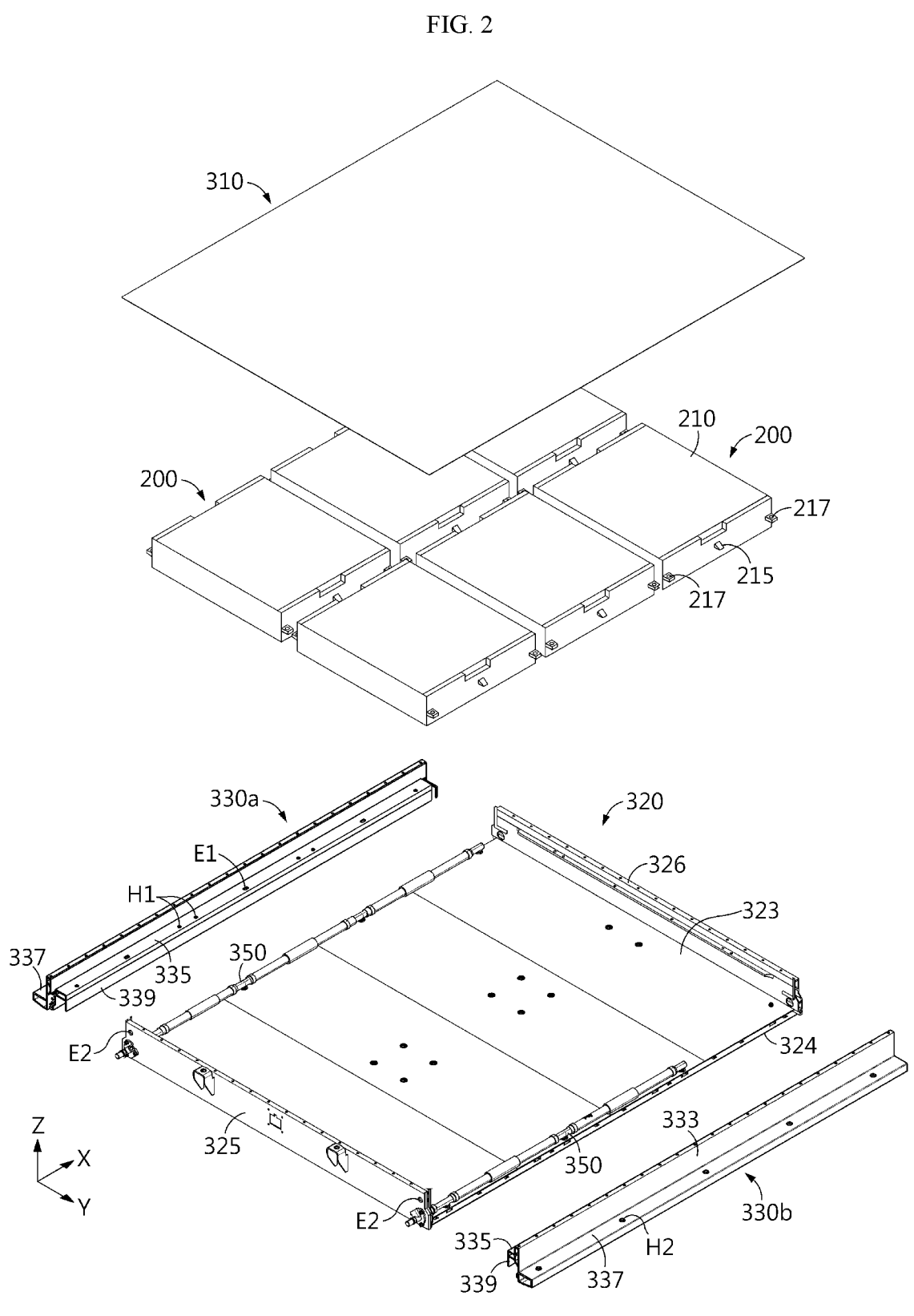
FIG. 2 is an exploded perspective view schematically showing components of the battery pack according to an embodiment of the present disclosure.

FIG. 1 is a perspective view schematically showing a battery pack according to an embodiment of the present disclosure. FIG. 2 is an exploded perspective view schematically showing components of the battery pack according to an embodiment of the present disclosure. Also, FIG. 3 is a perspective view schematically showing a plurality of secondary batteries, employed at the pack according to an embodiment of the present disclosure.

Figure 3:
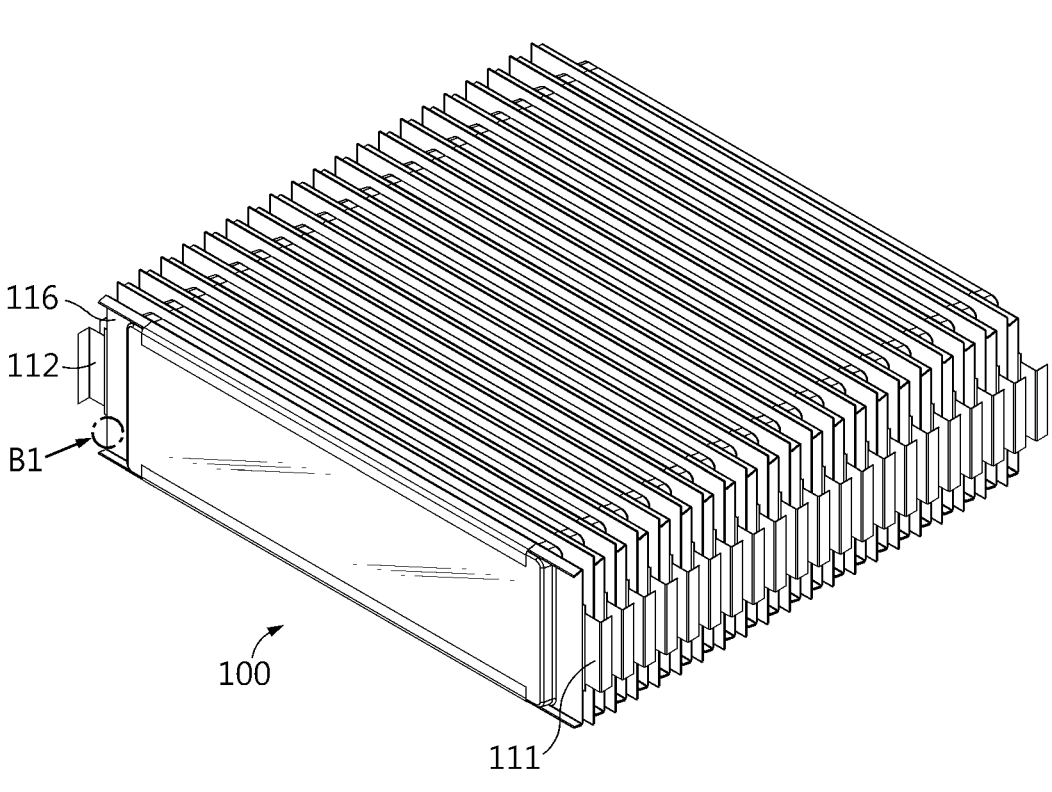
FIG. 3 is a perspective view schematically showing a plurality of secondary batteries, employed at the pack according to an embodiment of the present disclosure.

Referring to FIGS. 1 to 3, a battery pack 300 according to an embodiment of the present disclosure includes a plurality of battery modules 200, a tray 320, an upper cover 310, and a pair of side covers 330a, 330b.

Specifically, the battery module 200 may include a plurality of secondary batteries 100. The secondary battery 100 may be a pouch-type secondary battery 100 having an electrode assembly (not shown), an electrolyte (not shown) and a pouch 116 accommodating them therein. For example, as shown in FIG. 3, when viewed directly in the F direction (indicated FIG. 1), 21 pouch-type secondary batteries 100 may be stacked side by side in a front and rear direction inside the battery module 200.

Meanwhile, in this specification, unless otherwise specified, the "upper", "lower", "front", "rear", "left" and "right" directions will be based on when viewed in the F direction.

Further, as shown in FIG. 3, a positive electrode lead 112 and a negative electrode lead 111 may be formed at left and right ends opposite to each other with respect to the center of the secondary battery 100. That is, the positive electrode lead 112 may be provided at one end (left end) based on the center of the secondary battery 100. In addition, the negative electrode lead 111 may be provided at the other end (right end) based on the center of the secondary battery 100.

In addition, the secondary battery 100 may have a body provided in the form of standing upright in an upper and lower direction. The body of the secondary battery 100 may be elongated in a left and right direction. In addition, the plurality of secondary batteries 100 may be configured to discharge a gas in one side direction or the other side direction when an abnormal behavior such as a fire or thermal runaway occurs. For example, if the secondary battery 100 is a pouch-type battery, a part B1 of a sealing portion at one side or the other side of the pouch 116 may be formed to have a weakened sealing force. Alternatively, a part of the sealing portion at one side or the other side of the pouch may have a narrower sealing area than the other part.

Therefore, according to this configuration of the present disclosure, since the plurality of secondary batteries 100 are configured to discharge a gas in one direction or the other direction when an abnormal behavior occurs, it is possible to discharge a gas in an intended direction (towards a discharge port, explained below) from the inside of the battery module 200. Accordingly, it is possible to reduce gas stagnation inside the battery module 200, thereby effectively reducing a secondary explosion or the increase of fire of the secondary battery 100 inside the battery module 200.

However, the battery pack 300 according to the present disclosure is not limited to the pouch-type secondary battery 100 described above, and various types of secondary batteries 100 known at the time of filing of this application may be employed.

The battery pack 300 may include at least one bus bar (not shown) configured to electrically connect the plurality of secondary batteries 100 to each other. Specifically, the bus bar may have a conductive metal, and, for example, may have copper, aluminum, nickel, or the like.

Further, the battery pack 300 may include a wire-type bus bar (not shown) for electrically connecting the plurality of battery modules 200 to each other.

Meanwhile, each of the plurality of battery modules 200 may include a discharge port 215. The discharge port 215 may have an opening for discharging the gas generated inside the battery module 200 to the outside. The discharge port 215 may be formed at one side (in a negative direction of the X-axis) and/or the other side (in a positive direction of the X-axis) of the battery module 200. For example, even if the discharge ports 215 are formed at both sides of the battery module 200, any one of the discharge ports 215 at one side and the other side may be sealed by blocking the opening.

For example, among six battery modules shown in FIG. 2, the battery module 200 located at a left side may be sealed by blocking the opening of the discharge port at the other side (right side), and the battery module 200 located at a right side may be sealed by blocking the opening of the discharge port at one side (left side).

Further, the discharge port 215 may have a tube shape protruding toward the side cover 330. The discharge port 215 may be configured to be connected to an inlet E1 so that its end having a tube shape communicates with the inside of the side cover 330.

In addition, the tray 320 may be configured so that the plurality of battery modules 200 are mounted thereto. The tray 320 may include a mount plate 323 extending in a horizontal direction (X-axis direction and Y-axis direction). Moreover, the tray 320 may have a base plate 324 that is coupled to a lower portion of the mount plate 323. The tray 320 may include a front frame 325 and a rear frame 326 having a plate shape standing upright in an upper and lower direction (Z-axis direction). The front frame 325 may be coupled to a front end of the mount plate 323. The rear frame 326 may be coupled to a rear end of the mount plate 323.

Moreover, the tray 320 may have a discharge hole E2 for discharging a gas to the outside. For example, as shown in FIG. 2, the discharge hole E2 may be formed at each of a left side and a right side of the front frame 325. The discharge hole E2 may have an open shape so that the inside and the outside of the battery pack 300 communicate with each other.

In addition, the upper cover 310 may be coupled to an upper portion of the tray 320. The upper cover 310 may have a size capable of covering the plurality of battery modules 200 mounted to the tray 320.

Figure 4:
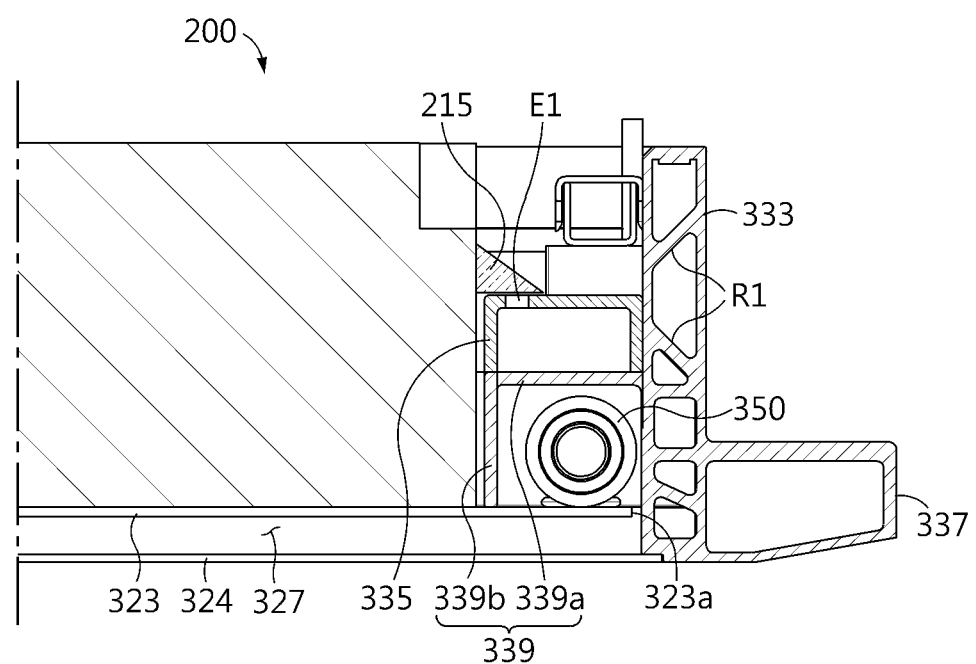
FIG. 4 is a partial sectional view schematically showing the battery pack of FIG. 1, taken along the line C-C'.

FIG. 4 is a partial sectional view schematically showing the battery pack of FIG. 1, taken along the line C-C'.

Referring to FIG. 4 along with FIG. 2, the side cover 330 may have a shape elongated in one direction (Y-axis direction). The side cover 330 may be shaped by extrusion molding. The front end of the side cover 330 may be coupled to the front frame 325. The rear end of the side cover 330 may be coupled to the rear frame 326.

Further, the side cover 330 may be positioned at each of one side and the other side of the mount plate 323 of the tray 320. For example, as shown in FIGS. 2 and 4, two side covers 330 may have body portions 333 located at left and right ends of the mount plate 323, respectively. Accordingly, the body portions 333 may serve as a left wall and a right wall of the battery pack 300. The body portions 333 may have a shape extending in a front and rear direction (Y-axis direction). For example, the body portion 333 may be formed in a plate shape by extrusion molding in a front and rear direction. The body portions 333 may have a shape standing upright in an upper and lower direction. The body portions 333 may have a plate shape with an empty inside.

In addition, the side cover 330 may include an inlet E1 formed by opening a part thereof. For example, the inlet E1 may be formed by opening a part of a gas discharge portion 335, explained later. The inlet E1 may be configured so that the outside and the inside of the side cover 330 may communicate with each other. Each of the plurality of inlets E1 may be connected to the discharge port 215. That is, the inlet E1 may be configured to face the opening of the discharge port 215 so that the gas discharge portion 335 and the discharge port 215 communicate with each other.

Moreover, the gas discharge portion 335 may have a shape extending in one direction to transport the gas introduced from the inlet E1 to the discharge hole E2. The gas discharge portion 335 may be formed at an inner side of the body portion 333. The gas discharge portion 335 may have a tube shape that extends in a front and rear direction and has an empty inside by means of extrusion molding. For example, as shown in FIG. 2, each of the two side covers 330 may have a gas discharge portion 335, and the gas discharge portion 335 may have a shape extending in a front and rear direction. A front end of the gas discharge portion 335 may be configured to be connected to the discharge hole E2 provided in the front frame 325.

In addition, the gas discharge portion 335 may be located above a pipe accommodation portion 339, explained later. Accordingly, the gas discharge portion 335 may utilize the empty space of the battery pack 300 formed in an upper and lower direction (Z-axis direction), so that the battery module 200 having a higher capacity may be mounted to the tray 320. That is, it is possible to increase the energy density of the battery pack 300.

Therefore, according to this configuration of the present disclosure, since the present disclosure includes a pair of side covers 330a, 330b having body portions 333 elongated in one direction and respectively located at one side and the other side of the tray 320, a plurality of inlets E1 formed by opening a part thereof and respectively connected to the discharge port 215, and a gas discharge portion 335 configured to transport the gas introduced from the inlet E1 to the discharge hole E2, when a high-temperature gas is generated due to an abnormal behavior such as fire or thermal runaway at any one of the plurality of battery modules 200, the generated high-temperature gas may be discharged to the outside through the gas discharge portion 335 of the side cover 330 located in an outer direction (X-axis direction) without raising the temperature of adjacent battery modules 200, thereby increasing the safety of the battery pack 300.

That is, in the present disclosure, the high-temperature gas generated from the battery module 200 may be transported to the side cover 330 located opposite to another battery module 200, thereby minimizing the effect of the high-temperature gas. Accordingly, when a fire or thermal runaway occurs at one battery module 200, it is possible to effectively prevent the thermal runaway or fire from spreading successively to other adjacent battery modules 200.

Moreover, since the side cover 330 is positioned at one side or the other side of the tray 320, it is possible to protect the plurality of battery modules 200 from impacts in a front and rear direction and a left and right direction. Accordingly, it is possible to increase the safety of the battery pack 300.

Figure 5:
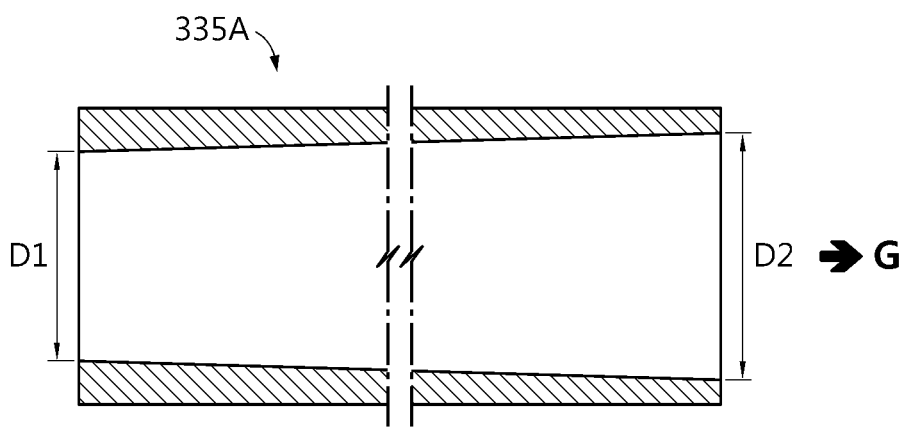
FIG. 5 is a partial sectional view schematically showing a gas discharge portion, employed at the pack according to an embodiment of the present disclosure.

FIG. 5 is a partial sectional view schematically showing a gas discharge portion, employed at the pack according to an embodiment of the present disclosure.

Referring to FIG. 5 along with FIGS. 2 and 4, the side cover 330 of FIG. 5 may is different from the side cover 330 of FIG. 4 in view of the shape of the gas discharge portion 335A. For example, the gas discharge portion 335A of the side cover 330 may be configured such that the sectional area of its inner tube is gradually increasing as being closer to the discharge hole E2 of the tray 320. That is, in the gas discharge portion 335A, the inner diameter D1 of the inner tube located far from the discharge hole E2 of the tray 320 may be smaller than the inner diameter D2 close to the discharge hole E2.

Accordingly, in the present disclosure, since the gas discharge portion 335A is configured to have an increasing sectional area in a direction G toward the discharge hole E2, among the entire region of the gas discharge portion 335A, a region close to the discharge hole E2 has a largest sectional area, so the region close to the discharge hole E2 may have a small internal pressure compared to the region located far from the discharge hole E2. Accordingly, it is possible to guide the gas introduced into the gas discharge portion 335A to move toward the discharge hole E2 of the gas discharge portion 335A where a relatively low pressure is formed.

Therefore, according to this configuration of the present disclosure, since the gas discharge portion 335A is configured so that its sectional area is gradually increasing as being closer to the discharge hole E2 of the tray 320, the gas may be guided to move to the discharge hole E2 so that the gas may be discharged quickly, thereby improving the safety of the battery pack 300.

Meanwhile, referring to FIG. 4 again along with FIG. 2, the body portion 333 of the side cover 330 may have an inner space surrounded by an outer wall. A reinforcing rib R1 may be provided in the inner space to extend from an inner surface of one side thereof to an inner surface of the other side thereof. For example, as shown in FIG. 4, the inner space surrounded by an outer wall may be formed inside the body portion 333 of the side cover 330. In the inner space, a plurality of reinforcing ribs R1 may be shaped to extend from an inner surface of one side thereof to an inner surface of the other side thereof.

In addition, the reinforcing rib R1 has a linear sectional area, but it is also possible that the reinforcing rib R1 has a shape elongated from a front end to a rear end of the body portion 333. However, the reinforcing rib R1 is not necessarily provided only to the body portion 333 of the side cover 330, and the reinforcing rib R1 may also be provided to the gas discharge portion 335, a mounting portion 337, explained later, and the pipe accommodation portion 339. That is, the gas discharge portion 335, the mounting portion 337 and the pipe accommodation portion 339 are components of the side cover 330, and when an external impact is applied to the battery pack 300, the reinforcing rib R1 may protect the internal components by means of its characteristic mechanical rigidity.

Therefore, according to this configuration of the present disclosure, since the reinforcing rib R1 is formed in the inner space of the side cover 330, it is possible to effectively increase the mechanical rigidity of the side cover 330. Accordingly, the battery pack 300 may safely protect the plurality of battery modules 200 from external impacts in a left and right direction and a front and rear direction.

Figure 6:
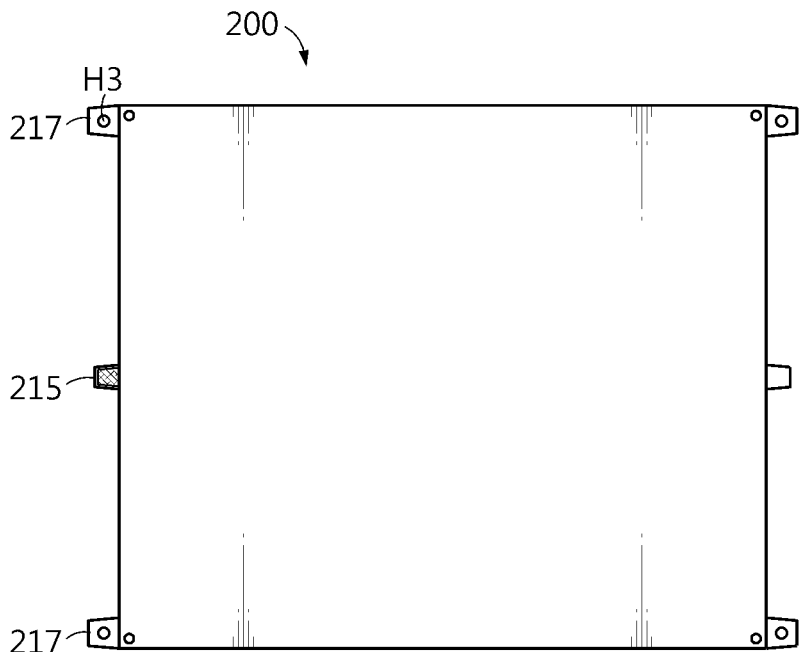
FIG. 6 is a bottom view schematically showing a battery module, employed at the pack according to an embodiment of the present disclosure.

FIG. 6 is a bottom view schematically showing a battery module, employed at the pack according to an embodiment of the present disclosure.

Meanwhile, referring to FIGS. 2 and 6, the battery module 200 of the battery pack of the present disclosure may include a module housing 210. The module housing 210 may have an inner space for accommodating the plurality of secondary batteries 100 therein. The module housing 210 may include a fixing portion 217 configured to be coupled to the side cover 330. The fixing portion 217 may be formed at one or more of one side and the other side of the module housing 210.

For example, as shown in FIG. 2, among the plurality of battery modules 200, a battery module 200 disposed at a right side may have a fixing portion 217 formed at a left side thereof conversely, a battery module 200 disposed a left side may have a fixing portion 217 formed at a right side thereof. Alternatively, fixing portions 217 may be provided at both sides of the battery module 200. The battery module 200 may have two fixing portions 217 at one side or the other side thereof. For example, the two fixing portions 217 may have a coupling hole H3 formed at a position corresponding to a fastening hole H1 formed in the side cover 330. The fixing portion 217 may be coupled to the side cover 330 using a fastening bolt (not shown) and a nut (not shown) respectively inserted into the fastening hole H1 and the coupling hole H3.

Therefore, according to this configuration of the present disclosure, since the fixing portion 217 configured to be coupled to the side cover 330 is provided to at least one of one side and the other side of the module housing 210, the plurality of battery modules 200 may be fixed to the side cover 330. Accordingly, when the battery pack 300 is mounted to a vehicle exposed to a frequent vibration environment, damage to the battery module 200 caused by frequent vibration may be effectively reduced.

Meanwhile, referring to FIGS. 1, 2 and 4 again, the battery pack 300 may further include a cooling pipe 350 configured to allow a coolant (not shown) to flow therein. The cooling pipe 350 may have a pipe shape. The coolant may be water.

In addition, the side cover 330 may include a pipe accommodation portion 339 configured to accommodate the cooling pipe 350 therein. The pipe accommodation portion 339 may be a space whose outer wall is formed to surround at least a part of the cooling pipe 350. For example, as shown in FIG. 4, the pipe accommodation portion 339 includes a part 339a whose outer wall extends in an inner direction (right direction) from the inner surface of the body portion 333, and a remaining par 339b extending from an end of the extended part 339a in a lower direction.

Therefore, according to this configuration of the present disclosure, since the side cover 330 includes a pipe accommodation portion 339 whose outer wall is formed to surround at least a part of the cooling pipe 350 so that the cooling pipe 350 is accommodated therein, the side cover 330 may surround and protect the cooling pipe 350, thereby preventing the cooling pipe 350 from being damaged due to an external impact.

Meanwhile, referring to FIG. 4 again, the tray 320 may include a temporary storage portion 327. Specifically, the temporary storage portion 327 may be configured such that when a coolant leaks out from the cooling pipe 350, the leaked coolant flows therein. For example, as shown in FIG. 4, the temporary storage portion 327 may be formed in a space between the mount plate 323 and the base plate 324.

In addition, an end 323a of the mount plate 323 may be configured to be spaced apart from the body portion 333 of the side cover 330. If a coolant leaks out from the cooling pipe 350, the leaked coolant may flow into the temporary storage portion 327 through a spaced gap between the end 323a of the mount plate 323 and the side cover 330.

Therefore, according to this configuration of the present disclosure, since the tray 320 includes a temporary storage portion 327 configured such that when a coolant leaks out from the cooling pipe 350, the leaked coolant flows therein, it is possible to prevent the leaked coolant from flowing into the battery module 200, thereby preventing the occurrence of an electric leakage, a circuit interruption, a short circuit, or the like of the battery module 200 by the coolant.

Meanwhile, referring to FIG. 2 again, the side cover 330 may further include a mounting portion 337. The mounting portion 337 may be provided to an outer side of the body portion 333 to be coupled to an external device. The mounting portion 337 may have a fastening structure to be coupled to an external device. For example, the mounting portion 337 may be bolted to a component in a vehicle body. For the bolting connection, the mounting portion 337 may have a bolting hole H2 into which a bolt is inserted.

Therefore, according to this configuration of the present disclosure, since the side cover 330 further includes a mounting portion 337 having a fastening structure to be coupled to an external device and provided at an outer side of the body portion 333, the battery pack 300 may be stably fixed to an external device.

Moreover, the mounting portion 337 may be configured to protect the plurality of battery modules 200 located therein from an external impact. To this end, the mounting portion 337 may have a shape protruding outward from the body portion 333. The mounting portion 337 may be formed to have a hollow therein. That is, the mounting portion 337 may have a shape protruding outward to absorb or protect an impact applied to the left and right sides of the battery pack 300.

Figure 7:
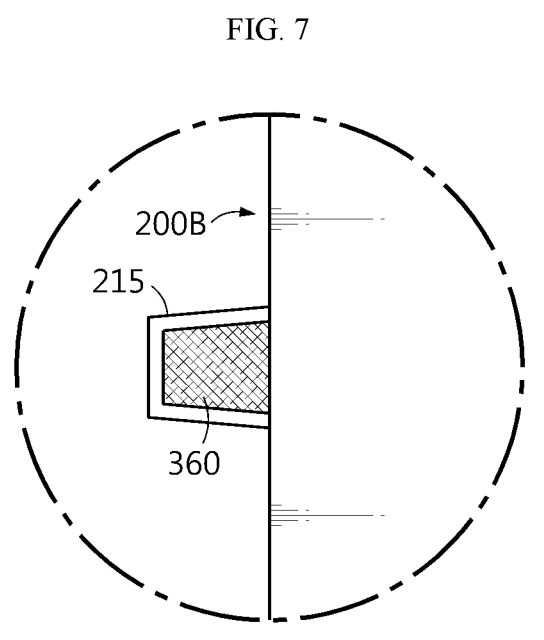

FIG. 7 is a partial bottom view schematically showing a battery module, employed at a battery pack another embodiment of the present disclosure.

Referring to FIG. 7 along with FIGS. 4 and 6, a battery module 200B of the battery pack according to another embodiment of the present disclosure may include a stopper 360 in the discharge port 215. The stopper 360 may seal an outlet of the discharge port 215 below a predetermined temperature. The stopper 360 may be configured to be melt and lost above the predetermined temperature. For example, the stopper 360 may have a material with a melting point of 200° C. or higher. For example, the stopper 360 may be made of a paraffin material. The stopper 360 may be configured to open the discharge port 215, for example, at 200° C. by being melted and lost.

Therefore, according to this configuration of the present disclosure, since the battery module 200B of the present disclosure includes a stopper 360 configured to seal the discharge port 215 below a predetermined temperature and to be melt and lost above the predetermined temperature to open the discharge port 215, the stopper 360 is melt and lost due to a high-temperature gas of the battery module 200B where a fire or thermal runaway occurs, thereby opening the discharge port 215 to discharge the high-temperature gas to the outside. The discharge port 215 is sealed during ordinary times when the internal temperature is maintained below the predetermined temperature, thereby preventing foreign substances (conductive substances) from flowing into the battery module 200B.

Moreover, by applying the stopper 360, when high-temperature gas is discharged from the battery module 200B where a fire or thermal runaway occurs, the battery module 200B of the present disclosure may prevent the gas moving to the gas discharge portion 335 from flowing into other adjacent battery modules 200B through the discharge port 215 of the adjacent battery modules 200B.

Meanwhile, the battery pack 300 according to an embodiment of the present disclosure may further include various devices (not shown) for controlling the charging and discharging of the battery module 200, for example, a BMS (Management System Module), a current sensor, a fuse, and the like.

Meanwhile, an electronic device (not shown) according to an embodiment of the present disclosure includes at least one battery pack 300 described above. The electronic device may further include a device housing (not shown) having an accommodation space for accommodating the battery pack 300, and a display unit through which the user may check the state of charge of the battery pack 300.

In addition, the battery pack 300 according to an embodiment of the present disclosure may be included in a vehicle such as an electric vehicle or a hybrid electric vehicle. That is, the battery pack 300 according to an embodiment of the present disclosure as described above may be mounted in a vehicle body of the vehicle according to an embodiment of the present disclosure. At this time, the side cover 330 may be coupled to a vehicle body of the vehicle.

Meanwhile, even though the terms indicating directions such as upper, lower, left, right, front and rear directions are used in the specification, it is obvious to those skilled in the art that these merely represent relative positions for convenience in explanation and may vary based on a position of an observer or an object.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

| Reference Signs | | |
|---|---|---|
| 300: battery pack | | |
| 200: battery module | | 310: upper cover |
| 100: secondary battery | | 210: module housing |
| 215: discharge port | | 217: fixing portion |
| 320: tray | | 325, 326: front frame, rear frame |
| 323, 324: mount plate, base plate | | |

-continued

| Reference Signs |
| --- |

E2: discharge hole
327: temporary storage portion
330, 330a, 330b: side cover
333, 335, 337, 339: body portion, gas discharge portion, mounting portion, pipe accommodation portion

| E1: inlet | R1: reinforcing rib |
| --- | --- |
| 350: cooling pipe | 360: stopper |

What is claimed is:

1. A battery pack, comprising:

a plurality of battery modules, each battery module of the plurality of battery modules having a discharge port configured to discharge a gas generated therein;

a tray, the plurality of battery modules mounted on top of the tray, the tray having a discharge hole for discharging the gas; and a pair of side covers extending upwardly from the tray in a first direction, each side cover of the pair of side covers having a body portion elongated in one direction and respectively located at a first side and a second side of the tray, a plurality of inlets formed in the pair of side covers, and a gas discharge portion configured to transport the gas introduced from the plurality of inlets to the discharge hole, the gas discharge portion formed by a pair of side walls and a top wall of the respective side cover, wherein the discharge port of each of the plurality of battery modules is connected to a respective one of the plurality of inlets, wherein the plurality of inlets are formed in the top wall of each of the pair of side covers, and wherein the discharge port of each of the plurality of battery modules is above the top wall of one of the pair of side covers so that the top wall is between the discharge port and tray in the first direction.

2. The battery pack according to claim 1, wherein the gas discharge portion has a gradually increasing sectional area in a direction of the discharge hole of the tray.

3. The battery pack according to claim 1, wherein the body portion of each side cover has an inner space surrounded by an outer wall, and a reinforcing rib extending from an inner surface of a first side of the body portion to an inner surface of a second side of the body portion is provided in the inner space.

4. The battery pack according to claim 1, wherein each battery module of the plurality of battery modules includes:

a plurality of secondary batteries; and a module housing configured to accommodate the plurality of secondary batteries therein, wherein a fixing portion configured to be coupled to the side cover is provided to at least one of a first side and a second side of the module housing.

5. The battery pack according to claim 4, wherein the plurality of secondary batteries are configured to discharge the gas in a first side direction or in a second side direction when an abnormal behavior occurs.

6. The battery pack according to claim 1, further comprising:

a cooling pipe configured to allow a coolant to flow therein, wherein a first side cover of the pair of side covers includes a pipe accommodation portion configured to surround at least a part of the cooling pipe so that the cooling pipe is accommodated therein.

7. The battery pack according to claim 6, wherein the tray includes a temporary storage portion configured so that when a coolant leaks out from the cooling pipe, the leaked coolant flows into the temporary storage portion.

8. The battery pack according to claim 1, wherein each side cover further includes a mounting portion having a fastening structure to be coupled to an external device and provided to an outer side of the body portion.

9. The battery pack according to claim 1, wherein each battery module includes a stopper configured to seal the discharge port below a predetermined temperature and melt above the predetermined temperature to open the discharge port.

10. An electronic device, comprising at least one battery pack according to claim 1.

11. A vehicle, comprising at least one battery pack according to claim 1.

12. The battery pack according to claim 1, wherein the tray comprises a base plate and a mount plate above the base plate, a space between the base plate and mount plate and the mount plate creating an opening to the space.

13. The battery pack according to claim 6, wherein the gas discharge portion is above the pipe accommodation portion.

14. The battery pack according to claim 1, wherein each discharge port is a tube having an end communicating with an inside of one of the pair of side covers.

15. A battery pack, comprising:

a plurality of battery modules, each battery module of the plurality of battery modules having a discharge port configured to discharge a gas generated therein;

a tray, the plurality of battery modules mounted on top of the tray, the tray having a discharge hole for discharging the gas; and a pair of side covers, each side cover of the pair of side covers having a body portion elongated in one direction and respectively located at a first side and a second side of the tray, a plurality of inlets formed in the pair of side covers, and a gas discharge portion configured to transport the gas introduced from the plurality of inlets to the discharge hole, the gas discharge portion formed by a pair of side walls and a top wall of the respective side cover, wherein the discharge port of each of the plurality of battery modules is connected to a respective one of the plurality of inlets, wherein the plurality of inlets are formed in the top wall of each of the pair of side covers, and wherein the discharge port of each of the plurality of battery modules extends over the top wall of one of the pair of side covers, wherein an entry into the discharge port from each of the plurality of battery modules is perpendicular to an exit from the discharge port into one of the plurality of inlets in the top wall of the side cover.

16. The battery pack according to claim 1, wherein a first end of each discharge port directly connects to a respective battery module and a second end of the discharge port directly connects to the side cover.

17. The battery pack according to claim 1, wherein the top wall of the side cover extends between the pair of side walls to form the gas discharge portion.

18. The battery pack according to claim 1, wherein the top wall does not face the battery module.

* * * * *